US012576786B2

(12) United States Patent
Schuling et al.

(10) Patent No.: US 12,576,786 B2
(45) Date of Patent: Mar. 17, 2026

(54) RUNNING BOARD ASSEMBLIES FORMED BY MULTI-PIECE BODIES

(71) Applicant: Dee Zee, Inc., Des Moines, IA (US)

(72) Inventors: Eric Schuling, Bondurant, IA (US); Matthew Guerdet, Polk City, IA (US)

(73) Assignee: Dee Zee, Inc., Des Moines, IA (US)

( * ) Notice: Subject to any disclaimer, the term of this patent is extended or adjusted under 35 U.S.C. 154(b) by 534 days.

(21) Appl. No.: 17/897,522

(22) Filed: Aug. 29, 2022

(65) Prior Publication Data

US 2023/0068729 A1     Mar. 2, 2023

Related U.S. Application Data

(60) Provisional application No. 63/239,098, filed on Aug. 31, 2021.

(51) Int. Cl.
B60R 3/00          (2006.01)
(52) U.S. Cl.
CPC .................................... B60R 3/002 (2013.01)
(58) Field of Classification Search
CPC .................................................... B60R 3/002
See application file for complete search history.

(56) References Cited

U.S. PATENT DOCUMENTS

| | | | | |
|---|---|---|---|---|
| 5,713,589 | A * | 2/1998 | Delgado | B60R 3/00 |
| | | | | 280/169 |
| 6,581,946 | B2 * | 6/2003 | Lund | B60R 3/002 |
| | | | | 280/169 |
| 8,136,826 | B2 * | 3/2012 | Watson | B60R 3/02 |
| | | | | 280/166 |
| 8,403,348 | B1 * | 3/2013 | Wang | B60R 3/002 |
| | | | | 280/165 |
| 8,864,158 | B1 * | 10/2014 | Perkins | B60R 3/002 |
| | | | | 280/163 |
| 9,511,716 | B2 * | 12/2016 | Montoya | B60R 9/02 |
| 10,427,607 | B2 * | 10/2019 | Otacioglu | B60R 3/002 |
| 10,604,076 | B2 * | 3/2020 | Lanini | B60R 3/002 |
| 11,420,563 | B2 * | 8/2022 | Luo | B60R 3/002 |
| 2007/0296175 | A1 * | 12/2007 | Flajnik | B60R 3/002 |
| | | | | 280/169 |
| 2008/0258421 | A1 * | 10/2008 | Crandall | B60R 3/002 |
| | | | | 280/163 |
| 2012/0104718 | A1 * | 5/2012 | Alvarez | B60R 3/00 |
| | | | | 280/163 |

FOREIGN PATENT DOCUMENTS

| | | | | | |
|---|---|---|---|---|---|
| CN | 111791802 | A | * | 10/2020 | B60R 3/002 |
| KR | 20120122681 | A | * | 11/2012 | B60R 3/002 |
| RU | 2666484 | C2 | * | 9/2018 | B60R 3/00 |

OTHER PUBLICATIONS

RU-2666484-C2 English Translation (Year: 2018).*
KR-20120122681-A English Translation (Year: 2012).*

* cited by examiner

*Primary Examiner* — Michael T. Walsh
(74) *Attorney, Agent, or Firm* — Dinsmore & Shohl LLP

(57)          ABSTRACT

A running board assembly includes a board body having an elongated length that extends in a vehicle longitudinal direction. The board body includes a center body part having a first exterior facing surface that defines a stepping area and an end body part having a second exterior facing surface adjacent the first exterior facing surface. The center and end body parts formed as separate parts and connected together at end surfaces forming a seam that extends in a widthwise direction of the board body.

20 Claims, 5 Drawing Sheets

RUNNING BOARD ASSEMBLIES FORMED BY MULTI-PIECE BODIES

CROSS-REFERENCE TO RELATED APPLICATION

This application claims the benefit of U.S. Provisional Patent Application No. 63/239,098 filed Aug. 31, 2021, hereby incorporated by reference in its entirety.

TECHNICAL FIELD

The present specification generally relates to running board assemblies and, more specifically, running board formed by multi-piece bodies.

BACKGROUND

A vehicle running board is an accessory that has popularity among higher profile vehicles. Some conventional running boards may generally include an elongated body that is flat and mounted near a rocker panel of the vehicle. The body may be further machined in order to provide various surface features, such as openings, grooves and ridges. Because of the length of the elongated body, the running boards may be somewhat difficult and costly to manufacture. For example, the running boards may be heavy and require large forming equipment.

Accordingly, a need exists for alternative running boards that are formed by multi-piece bodies that may be more readily manufactured and assembled.

SUMMARY

In one embodiment, a running board assembly includes a board body having an elongated length that extends in a vehicle longitudinal direction. The board body includes a center body part having a first exterior facing surface that defines a stepping area and an end body part having a second exterior facing surface adjacent the first exterior facing surface. The center body part and end body part formed as separate parts and connected together at end surfaces forming a seam that extends in a widthwise direction of the board body.

In another embodiment, a method of assembling a board body of a side step assembly is provided. The method includes abutting end surfaces of a center body part and an end body part thereby forming a seam that extends in a widthwise direction of the board body. The center body part and the end body part are connected together to form board body.

In another embodiment, a board body of a running board includes a center body part having a first exterior facing surface that defines a stepping area. A front body part has a second exterior facing surface adjacent the first exterior facing surface. The front body part is connected to the center body part along a first seam that extends in a widthwise direction of the board body. A rear body part has a third exterior facing surface that is adjacent the first exterior facing surface. The rear body part is connected to the center body part along a second seam that extends in a widthwise direction of the board body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure is generally directed to vehicle running board assemblies that include a board body having an elongated length that extends in a vehicle longitudinal direction. The board body is formed by multiple sections including a center body part having a first exterior facing surface that defines a stepping area, a front body part having a second exterior facing surface and a rear body part having a third exterior facing surface. The center, front and rear body parts are formed as separate parts and connected together forming laterally-extending divides that may be covered with a coating, providing a seamless exterior stepping surface.

Figure 1:
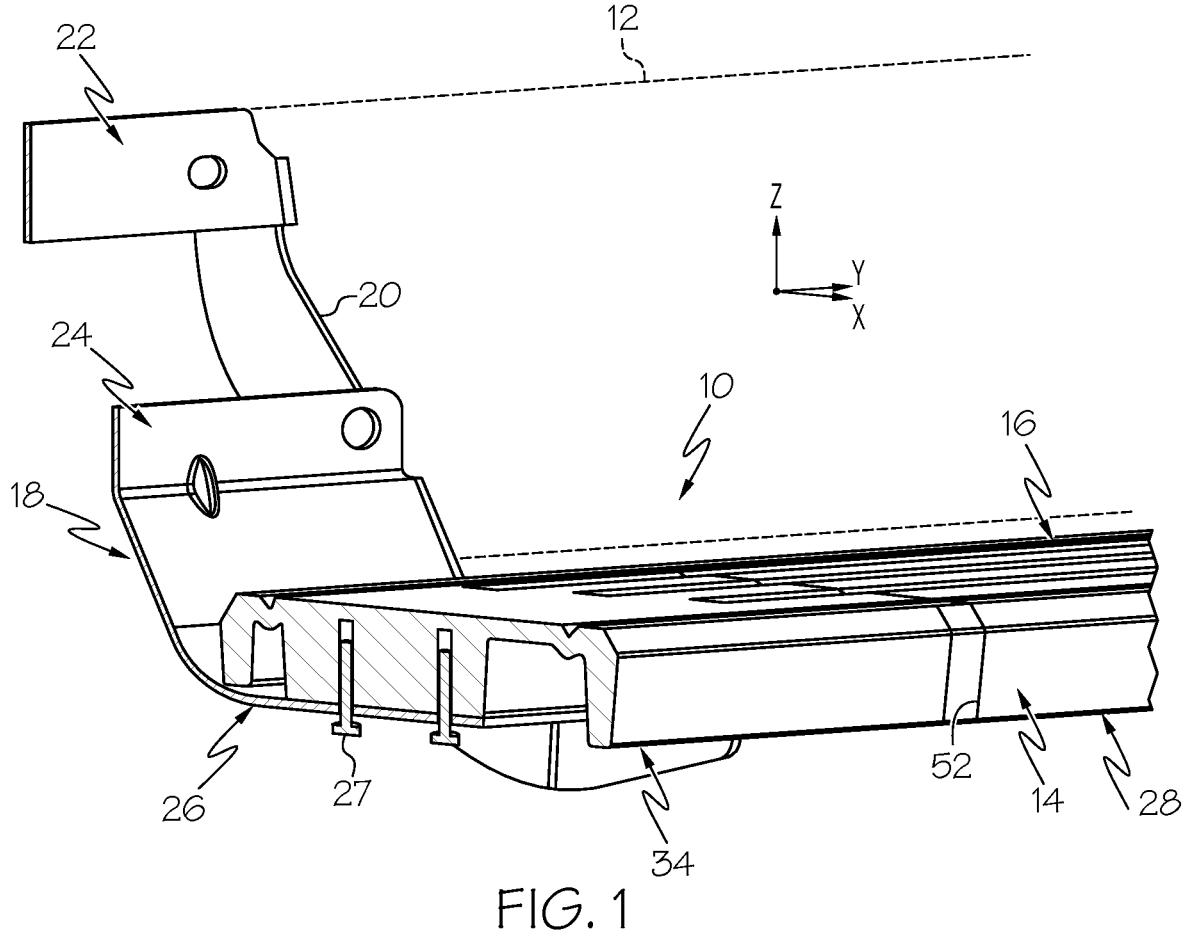
FIG. 1 is a diagrammatic perspective section view of a running board assembly along line 1-1 of FIG. 2 coupled to a frame of a vehicle, according to one or more embodiments shown and described herein.

Referring to FIG. 1, a side section view of a running board assembly 10 coupled to a vehicle (represented by broken lines 12) is illustrated. As used herein, the term "running board" is meant to include any type of vehicle side step, such as side bars, step bars, nerf bars, etc. The running board assembly 10 includes a board body 14 that has an elongated length that extends in a vehicle longitudinal direction Y. The board body 14 may extend along a majority of a passenger cabin such that the board body 14 extends under both a front passenger door opening and a rear passenger door opening. It is contemplated that the board body 14 may be any length suitable for providing a stepping area 16 thereon. For example, in some embodiments the board body 14 may only extend a width of a vehicle door opening. In other embodiments, the board body 14 may extend beyond the passenger cabin toward a rear of the vehicle 10. For example, when the vehicle 10 is a truck, it may be desirable for the board body 14 to extend along a portion of the truck bed such that the running assembly 10 can be used for accessing the truck bed.

One or more mounting brackets 18 may be used to mount the running board assembly 10 to the vehicle 12. The mounting bracket 18 may include a relatively vertical portion 20 that mounts to the vehicle 12 at mounting areas 22 and 24 and a relatively horizontal portion 26 that mounts to an underside of the board body 14 (e.g., using fasteners 27) firmly holding and supporting the running board assembly 10 relative to the vehicle 12. The mounting bracket 18 that is illustrated is merely exemplary and any suitable mounting bracket configuration may be used.

Figure 2:
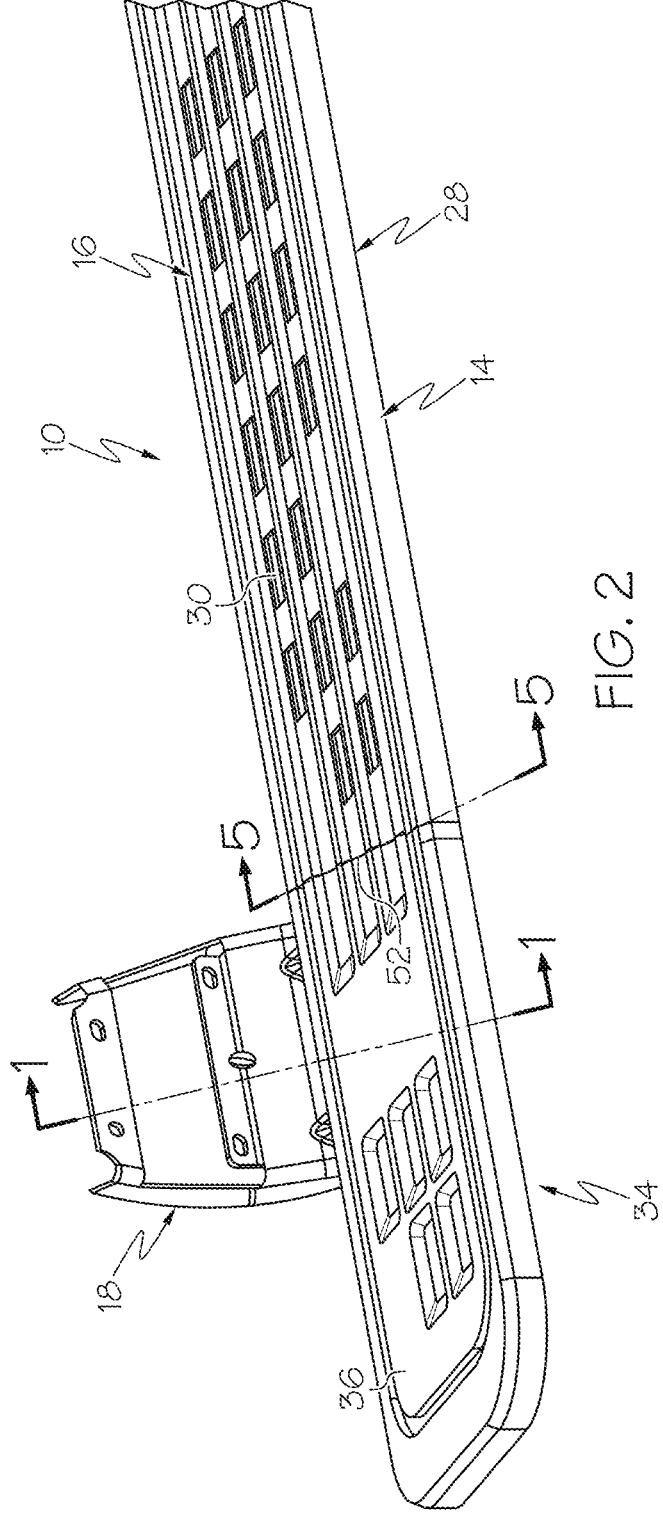
FIG. 2 is a perspective view of the running board assembly of FIG. 1, according to one or more embodiments shown and described herein.
Figure 3:
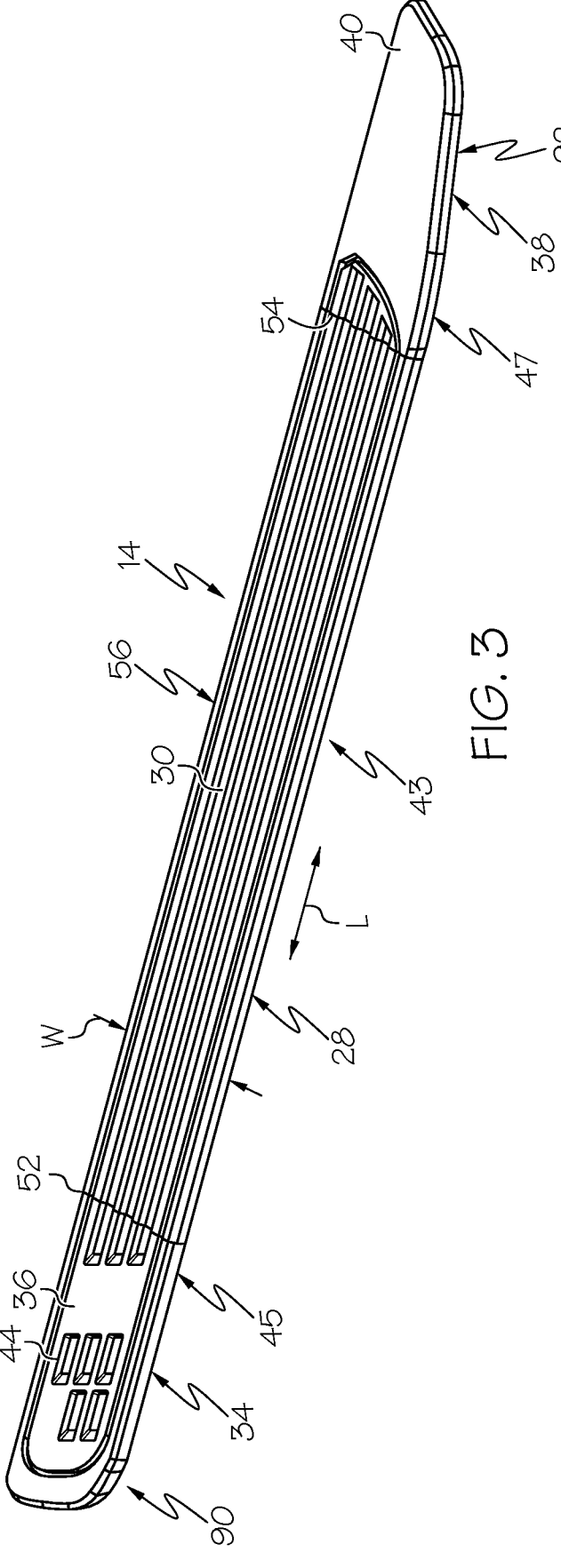
FIG. 3 is a perspective view of a board body in an assembled configuration, according to one or more embodiments shown and described herein.

Referring to FIGS. 2 and 3, the board body 14 may be formed by three sections including a center body part 28 having a first exterior facing surface 30 that defines at least a portion of the stepping area 16, a front body part 34 having a second exterior facing surface 36 that may define a portion of the stepping area 16 and a rear body part 38 (FIG. 3) having a third exterior facing surface 40 that may define a portion of the stepping area 16. The front and rear body parts 34 and 38 may be referred to as end body parts. In the illustrated mounted configuration, the exterior facing surfaces 30, 36 and 40 face upward in a vehicle vertical direction Z and opposite exterior facing surfaces 43, 45, 47 face downward toward the ground. In some embodiments, a coating 50 (FIG. 5) or step pad may be located on the exterior facing surfaces 30, 36 and 40 for increased traction when stepping on the running board assembly 10. As will be described in greater detail below, the body parts 28, 34 and 38 are formed as separate parts and connected together forming seams 52, 54 that extend the width of the board body 14. It should be noted that while the seams 52 and 54 are illustrated as extending substantially transverse to the longitudinal direction, the seams may extend in both the vehicle longitudinal and transverse directions forming interlocking end surfaces.

Referring to FIG. 3, the board body 14 is illustrated in isolation. As can be seen, the board body 14 has the elongated length L that extends in the vehicle longitudinal direction. In this regard, the dimension of the elongated length L in the vehicle longitudinal direction Y is much greater than the dimension of a width W of the board body 14 in a vehicle lateral direction X. Various openings 44 are provided through the rear body part 38. Any one, two or all of the center body part 28, front body part 34 and rear body part 38 may include an alternating pattern 56 of ridges 57 and grooves 59 (FIG. 5) to provide additional traction when in use. The ridges 57 and grooves 59 of the center body part 28, front body part 34 and rear body part 38 may align along the elongated length L of the board body 14 when the board body 14 is assembled.

Referring also to FIG. 1, the board body 14 may be rectangular in cross-section and constructed of any suitable material, for example, aluminum, steel, plastic, and the like. The board body 14 may be manufactured through any suitable process, for example, extrusion, casting forging, etc. In the illustrated example, the center body part 28 may be formed using a first manufacturing process, such as extrusion due to its substantially constant width and the front a rear body parts 34 and 38 may be formed of a different manufacturing process, such as die casting or forging.

Figure 4:
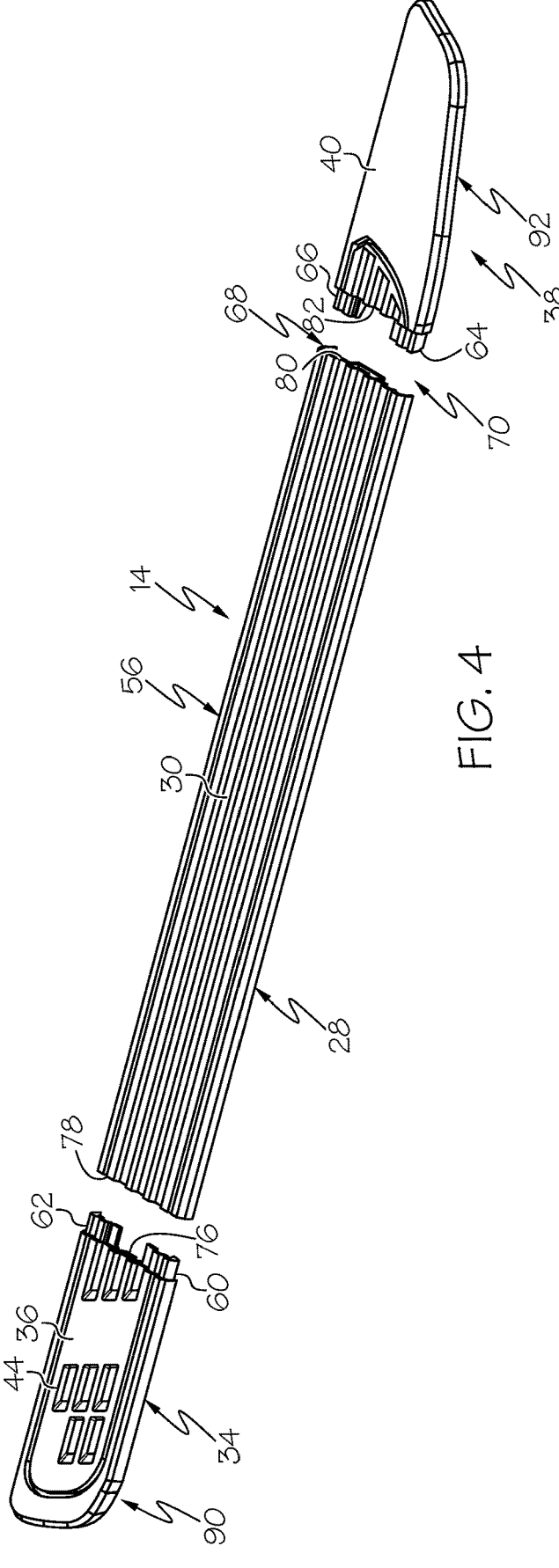
FIG. 4 is a perspective view of the board body of FIG. 3 in an unassembled configuration, according to one or more embodiments shown and described herein.
Figure 5:
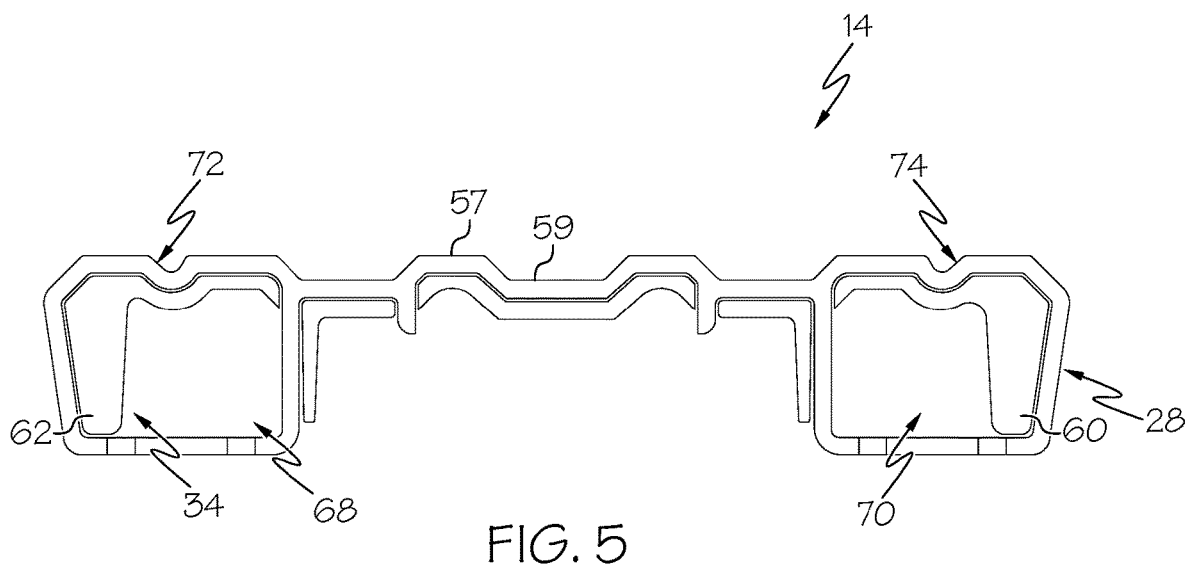
FIG. 5 is a section vie of the board body along line 5-5 of FIG. 2, according to one or more embodiments shown and described herein.

Referring to FIG. 4, the board body 14 is illustrated in an unassembled configuration including the center body part 28, the front body part 34 and the rear body part 38. As can be seen, the center body part 28 is longer than the front and rear body parts 34 and 38. The front body part 34 may include tabs 60 and 62 and the rear body part 38 may include tabs 64 and 66. Referring also to FIG. 5, the tabs 60, 62, 64 and 66 project outward in the vehicle longitudinal direction Y to be received within openings 68 and 70 that extend through the center body part 28. In some embodiments, interlocking features 72 and 74 comprising ridges and valleys may be provided in the tabs 60, 62, 64 and 66 and openings 68 and 70 to further interlock the body parts 28, 34 and 38 together. Once connected together with end surfaces 76, 78, 80 and 82 abutting, the body parts 28, 34 and 38 may be permanently connected together using adhesives, welding brazing etc. As used herein, the term "permanently connected" means that the body parts 28, 34 and 38 cannot be separated without breaking a bond between the body parts 28, 34 and 38. In other embodiments, the body parts 28, 34 and 38 may be releasably connected together using mechanical fasteners.

Figure 6:
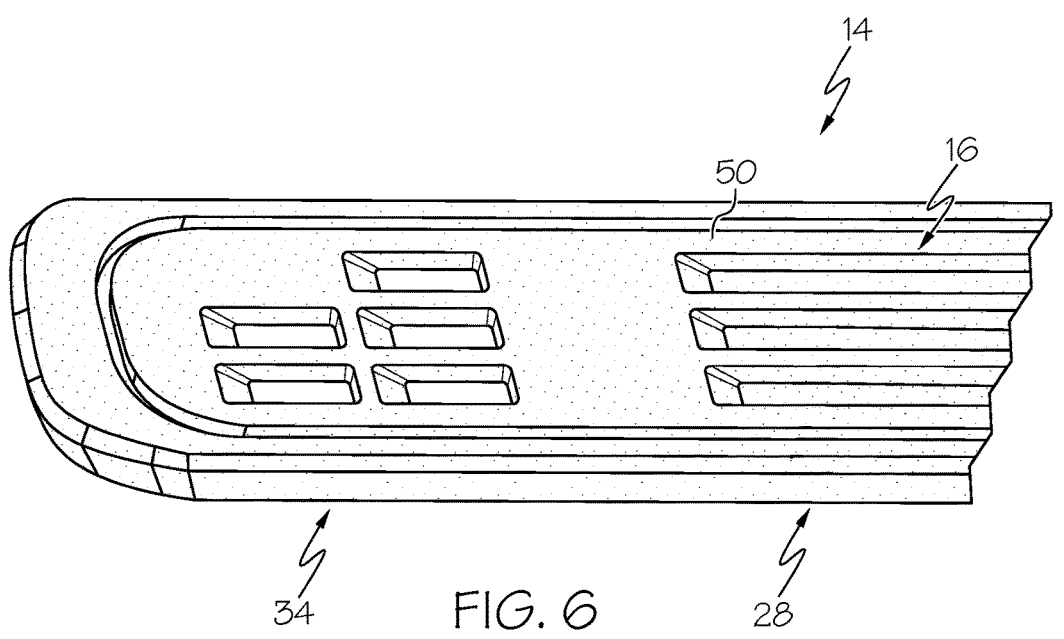
FIG. 6 is a perspective view of the board body of FIG. 3 with a coating, according to one or more embodiments shown and described herein.

Referring to FIG. 6, once permanently connected, the body parts 28, 34 and 38 may be coated with the anti-slip coating 50 or other suitable covering. Other surface modifiers may be used, such as step pads, welded on features, openings, ridges, etc. Because the end surfaces 76, 78, 80 and 82 have substantially the same profile, the outer perimeters at the end surfaces 76, 78, 80 and 82 match and no seam is visibly apparent through the coating 50. In this regard, the board body 14 may appear as a single, monolithic structure formed of a single piece of material. The front body part 34 and the rear body part 38 may have a non-rectangular perimeter, such as including tapered regions 90 and 92 of FIGS. 3 and 4, that can be formed by casting and/or forging and that can be difficult to form by an extrusion. Non-linear profiles may be formed in extruded body parts 28, 34 and 38 using stretch bending or other suitable method.

The above-described running board assemblies provide a multi-piece board body structure that includes a relatively long center body part and shorter front and rear body parts. The board body structure can be connected together to replicate the strength of a monolithic, single piece body. The multi-piece body configuration can allow for increased flexibility during manufacture that can be easier to perform and accomplished at increased speed with less expensive tooling. The body parts can be extruded, molded, milled, additive manufactured, etc. The first body parts can be plated, painted, coated etc. The front and rear body parts can have integrated bracket interfaces that attach to brackets attached to the vehicle. If a center bracket is needed, the center body part can include bracket interfaces. Common tooling can be used to form both of the front and rear body parts. Use of smaller body parts can alleviate supply issues for larger, single piece parts. The body parts can include secondary processing for additional features, such as openings, forms, welded on features, additional brace mounting locations, etc. Separate component step pad integration or additional top surface modifiers can be added for different top surface appearance features or for additional seam coverage options. While three body parts are discussed above, there may be more than three body parts or two body parts. For example, the center body part may be formed of multiple, shorter center body parts.

Embodiments can be described with reference to the following numbered clauses, with preferred features laid out in the dependent clauses:

Clause 1: A running board assembly comprising: a board body having an elongated length that extends in a vehicle longitudinal direction, the board body comprising: a center body part having a first exterior facing surface that defines a stepping area; and an end body part having a second exterior facing surface adjacent the first exterior facing surface, the center and end body part formed as separate parts and connected together at an end surface of the center body and an end surface of the end body part forming a first seam that extends in a widthwise direction of the board body.

5

Clause 2: The running board assembly of clause 1, wherein the stepping area is covered by a covering, the covering extending over the first seam.

Clause 3: The running board assembly of clause 2, wherein the covering is a coating.

Clause 4: The running board assembly of any of clauses 1-3, wherein the end body part is a front body part, the board body further comprising a rear body part having a third exterior facing surface adjacent the first exterior facing surface, the rear and center body parts being formed as separate parts and connected together at an end surface of the rear body part and another end surface of the center body part forming a second seam that extends in the widthwise direction of the board body.

Clause 5: The running board assembly of any of clauses 1-4, wherein the center body part is an extruded structure and the end body part is formed by one or both of casting and forging.

Clause 6: The running board assembly of any of clauses 1-5, wherein the end body part comprises a tapered region where the end body part decreases in width.

Clause 7: The running board assembly of any of clauses 1-6, wherein the center body part and the end body part comprise ridges and grooves that are aligned along the longitudinal length of the board body.

Clause 8: A method of assembling a board body of a side step assembly, comprising: abutting end surfaces of a center body part and an end body part thereby forming a seam that extends in a widthwise direction of the board body; and connecting the center body part and the end body part together to form board body.

Clause 9: The method of clause 8 further comprising extruding the center body part.

Clause 10: The method of clause 9 further comprising casting or forging the end body part.

Clause 11: The method of any of clauses 8-10 further comprising covering the seam with a covering.

Clause 12: The method of any of clauses 8-11 further comprising forming one or more openings in one or both of the center and end body parts.

Clause 13: The method of any of clauses 8-12, wherein the end body part is a front body part, the method further comprising: abutting end surfaces of the center body part and a rear body part forming another seam that extends in the widthwise direction of the board body; and connecting the center body part and the rear body part together to form the board body.

Clause 14: The method of any of clauses 8-13 further comprising forming a tapered region in the end body part where the end body part decreases in width.

Clause 15: The method of any of clauses 8-14 further comprising forming ridges and grooves in the center body part and the end body part and aligning the ridges and grooves along the longitudinal length of the board body.

Clause 16: A board body of a running board comprising: a center body part having a first exterior facing surface that defines a stepping area; a front body part having a second exterior facing surface adjacent the first exterior facing surface, the front body part connected to the center body part along a first seam that extends in a widthwise direction of the board body; and a rear body part having a third exterior facing surface adjacent the first exterior facing surface, the rear body part connected to the center body part along a second seam that extends in a widthwise direction of the board body.

Clause 17: The board body of clause 16, wherein the stepping area is covered by a covering, the covering extending over the first seam and the second seam.

Clause 18: The board body of clause 17, wherein the covering is a coating.

Clause 19: The board body of any of clauses 16-18, wherein the center body part is an extruded structure and the front and rear body parts are formed by one or both of casting and forging.

Clause 20: The board body of any of clauses 16-19, wherein the center body part and one or both of the front and rear body parts comprise ridges and grooves that are aligned along the longitudinal length of the board body.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A running board assembly comprising:
a board body having an elongated length that extends in a vehicle longitudinal direction, the board body comprising:
a center body part having a first exterior facing surface that defines a stepping area; and
an end body part having a second exterior facing surface adjacent the first exterior facing surface, the center body part and the end body part formed as separate parts and connected together at a center body part end surface and an end body part end surface forming a first seam that extends in a widthwise direction of the board body;
wherein the end body part comprises a bracket fastening location that is configured to fasten to a mounting bracket configured to mount the running board assembly to a vehicle, the end body part having a maximum width that is no greater than a maximum width of the center body part thereby forming a continuous side edge along a length of the center body part and past the bracket fastening location.

2. The running board assembly of claim 1, wherein the stepping area is covered by a covering, the covering extending over the seam.

3. The running board assembly of claim 2, wherein the covering is a coating.

4. The running board assembly of claim 1, wherein the end body part is a front body part, the board body further comprising a rear body part having a third exterior facing surface adjacent the first exterior facing surface, the rear body part and the center body part being formed as separate parts and connected together at another center body part end surface and another end body part end surface forming a second seam that extends in the widthwise direction of the board body.

5. The running board assembly of claim 1, wherein the center body part is an extruded structure and the end body part is formed by one or both of casting and forging.

6. The running board assembly of claim 1, wherein the end body part comprises a tapered region where the end body part decreases in width.

7. The running board assembly of claim 1, wherein the center body part and the end body part comprise ridges and grooves that are aligned along the longitudinal length of the board body.

8. A method of assembling a board body of a side step assembly, comprising:

abutting a center body part end surface of a center body part and an end body part end surface of an end body part thereby forming a first seam that extends in a widthwise direction of the board body;

connecting the center body part and the end body part together to form board body; and mounting a mounting bracket to the end body part at a bracket fastening location, the mounting bracket configured to mount the running board to a vehicle;

wherein the end body part has a maximum width that is no greater than a maximum width of the center body part thereby forming a continuous side edge along a length of the center body part and past the bracket fastening location.

9. The method of claim 8 further comprising extruding the center body part.

10. The method of claim 9 further comprising casting or forging the end body part.

11. The method of claim 8 further comprising covering the first seam with a covering.

12. The method of claim 8 further comprising forming one or more openings in one or both of the center and end body parts.

13. The method of claim 8, wherein the end body part is a front body part, the method further comprising:

abutting another center body part end surface of the center body part and a rear body part end surface of a rear body part forming a second seam that extends in the widthwise direction of the board body; and connecting the center body part and the rear body part together to form the board body.

14. The method of claim 8 further comprising forming a tapered region in the end body part where the end body part decreases in width.

15. The method of claim 8 further comprising forming ridges and grooves in the center body part and the end body part and aligning the ridges and grooves along the longitudinal length of the board body.

16. A board body of a running board comprising:

a center body part having a first exterior facing surface that defines a stepping area;

a front body part having a second exterior facing surface adjacent the first exterior facing surface, the front body part connected to the center body part along a first seam that extends in a widthwise direction of the board body; and a rear body part having a third exterior facing surface adjacent the first exterior facing surface, the rear body part connected to the center body part along a second seam that extends in a widthwise direction of the board body;

wherein the front body part comprises a bracket fastening location that is configured to fasten to a mounting bracket configured to mount the running board assembly to a vehicle wherein the front body part has a maximum width that is no greater than a maximum width of the center body part thereby forming a continuous side edge along a length of the center body part and past the bracket fastening location.

17. The board body of claim 16, wherein the stepping area is covered by a covering, the covering extending over the first seam.

18. The board body of claim 17, wherein the covering is a coating.

19. The board body of claim 16, wherein the center body part is an extruded structure and the front and rear body parts are formed by one or both of casting and forging.

20. The board body of claim 16, wherein the center body part and one or both of the front and rear body parts comprise ridges and grooves that are aligned along the longitudinal length of the board body.

\* \* \* \* \*